(12) United States Patent
Chin et al.

(10) Patent No.: US 6,300,942 B1
(45) Date of Patent: Oct. 9, 2001

(54) MOUSE DEVICE WITH UNITARY LINEARLY ARRANGED PHOTOSENSOR ENCODER

(75) Inventors: Kay Chin; Andrew Liang, both of Taipei Hsien (JP)

(73) Assignee: Unity Opto Technology Co., Ltd., Taipei Hsien (TW)

(*) Notice: Subject to any disclaimer, the term of this patent is extended or adjusted under 35 U.S.C. 154(b) by 0 days.

(21) Appl. No.: 09/359,425

(22) Filed: Jul. 23, 1999

(51) Int. Cl.[7] ....................................... G09G 5/08
(52) U.S. Cl. ............................. 345/165; 345/163
(58) Field of Search .................... 345/161, 163, 345/164, 165, 166, 167

(56) References Cited

U.S. PATENT DOCUMENTS

| | | | |
|---|---|---|---|
| 5,168,268 | * 12/1992 | Levy | 345/165 |
| 5,311,209 | * 5/1994 | Lin | 345/165 |
| 5,345,253 | * 9/1994 | Chang | 345/167 |
| 6,111,563 | * 8/2000 | Hines | 345/166 |
| 6,172,358 | * 1/2001 | Ho | 345/165 |

* cited by examiner

Primary Examiner—Bipin Shalwala
Assistant Examiner—David L Lewis
(74) Attorney, Agent, or Firm—Dougherty & Troxell

(57) ABSTRACT

The present invention relates to an improved structure of a shield used in a computer mouse. The shield includes a generating part and a receiving part which are formed by integration and arranged linearly for constructing the reflecting shield for the mouse. To make the manual work for inserting the shield into the circuit board of the mouse can be done by just one action of composition to avoid the time of actions of repeatedly inserting electrical elements into the circuit board and to reduce the production cost.

1 Claim, 2 Drawing Sheets

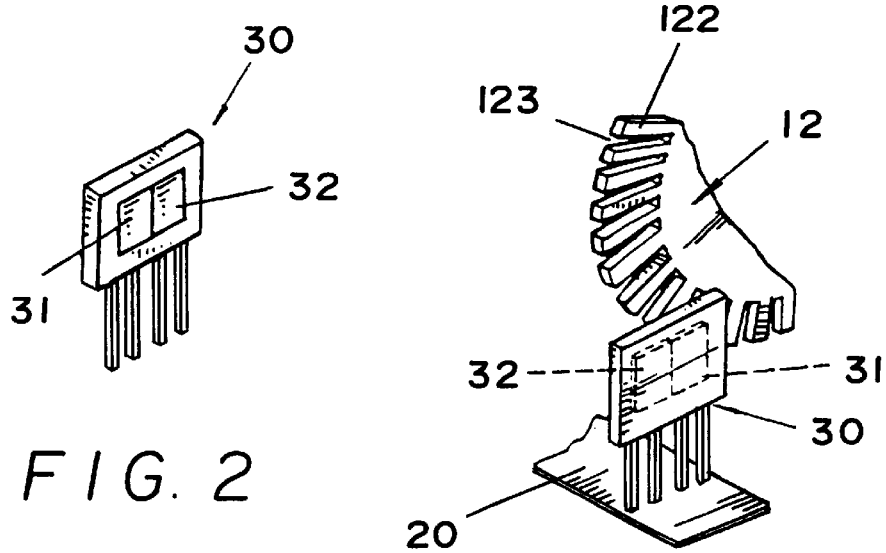
FIG. 2
FIG. 3
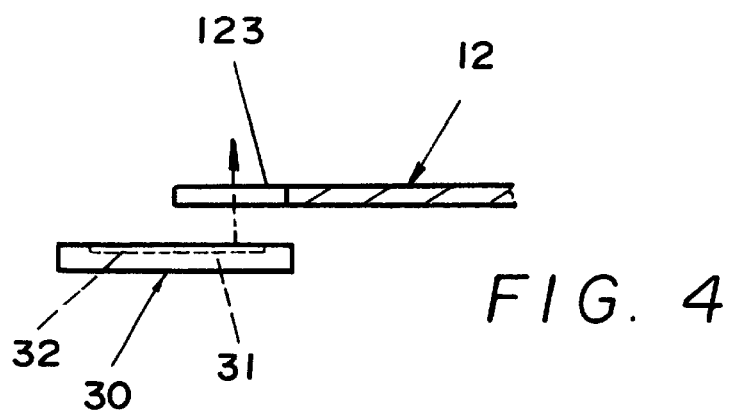
FIG. 4
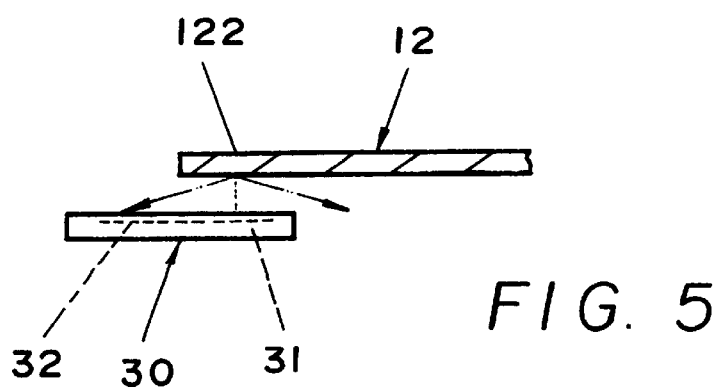
FIG. 5

MOUSE DEVICE WITH UNITARY LINEARLY ARRANGED PHOTOSENSOR ENCODER

FIELD OF THE INVENTION

The present invention relates to an improved structure of a shield used in a mouse, and, more particularly to an improved structure of a shield used in a mouse with a design of a shield which is formed by integration for reducing the production cost and composition cost, and for decreasing times of inserting slotting attachments.

BACKGROUND OF THE INVENTION

The mouse is an important periphery instrument of the computer, and, normally, the positioning pointer of the mouse is using the semi-optical type. As shown in FIG. 1, the structure of the ordinary mouse 10 uses the trackball 11 as the sliding and moving element. One smooth roller 12 of one pivot axle 121 is located in the longitudinal direction of the trackball 11, the other smooth roller 12 of the other pivot axle 121 is located in the latitudinal directions of the trackball 11, and a plurality of toothed wheels 122 are located around peripheries of the two smooth roller 12. There is a distance 123 between two toothed wheels 122, and there are a receiver 21 and a emitter 22 (such as the photo diode and the light emitting diode) respectively located on the circuit board 20 corresponding to both sides of the toothed wheel 122. The trackball 11 slides and moves to make the two pivot axles 121 rotate, and the two rotating pivot axles 121 would make the smooth roller 12 rotate between the receiver 21 and the emitter 22. However, while a light generated from the emitter 22 is incident to a position of the toothed wheel 122, the light would be shielded and the receiver 21 can not receive any light. While the light is incident to the distance 123 between two toothed wheels 122, the receiver 22 can easily receive the light. By shielding and receiving the light, the low level of the signal and the high level of the signal are formed to produce the corresponding coordinate signals of the X and Y axes of the monitor to make the pointer of the mouse 10 on the monitor move with motions of the mouse 10 according to coordinate signals.

However, during the assembly processes of the mouse 10, the all part including electrical elements and opto-electronics of the circuit board 20 are manually inserted, and the total number of the opto-electronics of the aforesaid X and Y axes are four, two for emitter 22 and two for receiver 21. That is, the operator would manually insert the opto-electronics four times, and each one should be inserted in the same angle to make the receiving path and the generating path uniform. However, by using the manually inserted method in enormously producing products the yield is lower and the sensibility of the mouse is degrading. Thus, the coupled way composed by the emitter and the receiver in the real manufacturing line would increase the production hours of product, make the composition of the mouse more difficult, and degrade the yield, so there are improvements needed to improve the aforesaid problems.

SUMMARY OF THE INVENTION

Accordingly, an object of the present invention is to provide an improved structure of a shield used in the mouse with a emitting part and a receiving part which are formed by integration and arranged linearly to form the reflecting composite device for the mouse to make the manual work for inserting the reflecting composite device into the circuit board of the mouse be done by just one action of composition to avoid the time of actions of repeatedly inserting emitter and receiver into the circuit board and to reduce the production cost.

BRIEF DESCRIPTION OF THE DRAWINGS

The above and other objects, features and other advantage of the present invention will be more clearly understood from the following detailed description taken in conjunction with the accompanying drawings, in which:

FIG. 2 is a cubical view which illustrates a shield of the present invention;

FIG. 3 is a composition view which illustrates FIG. 2 composed with the smooth roller;

FIG. 4 is a action diagram view which illustrates FIG. 3 without the receiving action; and FIG. 5 is a action diagram view which illustrates FIG. 3 with the receiving action.

DETAILED DESCRIPTION OF THE PREFERRED EMBODIMENT

Figure 1:
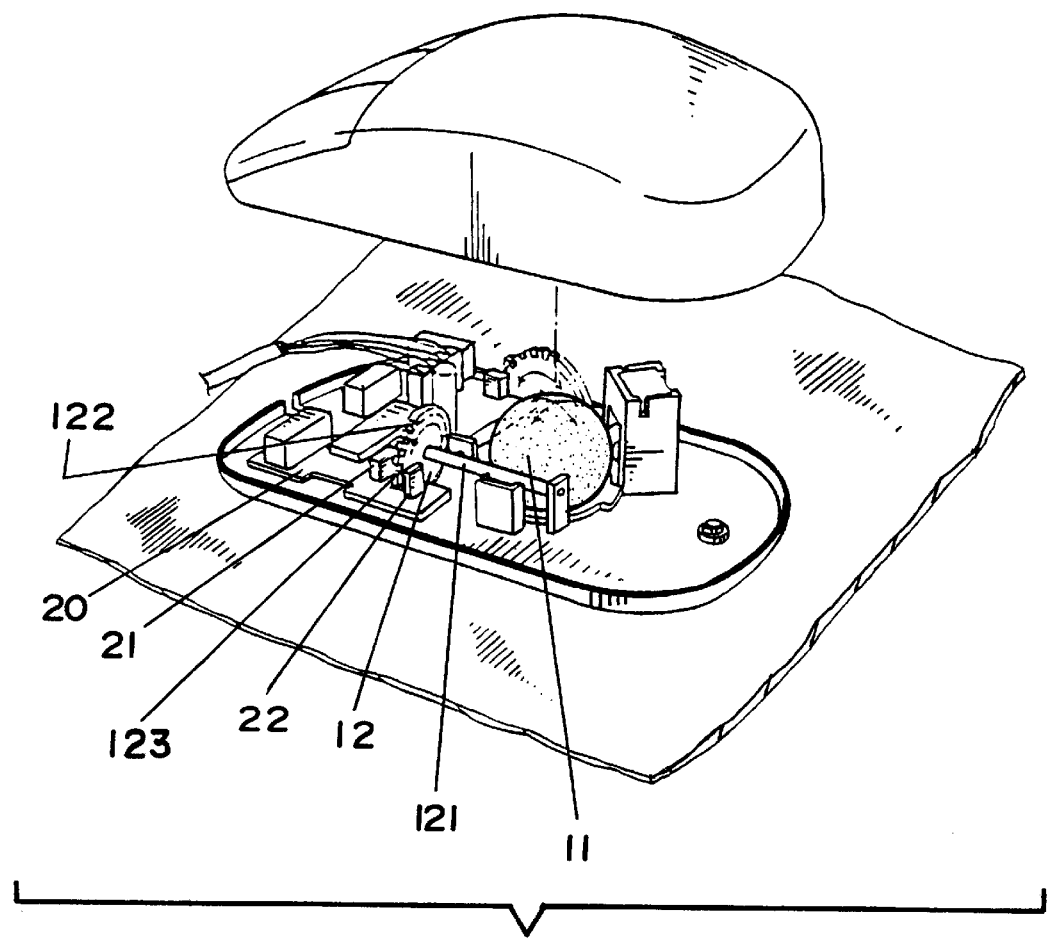
FIG. 1 is a composition view which illustrates the composition of the shield of the ordinary mouse.

As shown in FIGS. 2 and 3, the reflecting composite device 30 of the present invention includes a emitting part 31 and a receiving part 32 which are formed by integration and arranged linearly to form the so called reflecting composite device. The reflecting composite device 30 is composed in a side of the smooth roller 12 corresponding to a position of the toothed wheel 122 of the periphery of the smooth roller 12. While the mouse 12 moves, the smooth roller 12 would rotate with the rolling trackball 11.

Referring to FIG. 4, if the distance 123 between toothed wheels 122 is rotated to meet the generating part 31, the light generated from the generating part 31 goes through the distance 123, and the receiving part 32 can not receive any signals.

As shown in FIG. 5, if the toothed wheels is rotated to meet the generating part 31, the light generated from the generating part 31 is incident to the toothed wheel 122, reflected by the toothed wheel 122, and received by the receiving part 32. By receiving the reflected light and without receiving the change of the signal, the high level of the signal and the low level of the signal are formed to produce the corresponding coordinate signals of the X and Y axes of the monitor to make the pointer of the mouse 10 on the monitor move with motions of the mouse 10 according to coordinate signals.

The light shield with an improved structure of the present invention is formed by integration, is easily made, and has lower production cost. As for the embodiment of the aforesaid reflected composite device, it is easier to insert the opto parts compared with the ordinary mouse, and once the opto-electronics are inserted into the circuit board, the angle and latitude of the composition of the shield compared with the ordinary shield are not needed to be adjusted for reducing working hours of the product and the production cost, and for improving the sensibility of judging the rotation and motion of the mouse to make the mouse have the real improvement. However, the design of the improved structure of the light shield of the present invention has improvements in efficiency and progression.

The present invention has been described hitherto with exemplary preferred embodiments. However, it is to be understood that the scope of the present invention need not be limited to the disclosed preferred embodiments. On the contrary, it is intended to cover various modifications and similar arrangements with the scope defined in the following appended claims. The scope of the claims should be accorded the broadest interpretation so as to encompass all such modifications and similar arrangements.

What is claimed is:

1. An improved structure of a light shield using reflecting composite device in a side of a smooth roller of a mouse comprising:

an emitting part, and an receiving part, wherein the said emitting part and the said receiving part are formed by integration and arranged linearly to make a light generated from the said emitting part be incident to the said smooth roller and reflected to and received by the said receiving part for constructing a reflecting composite device.

* * * * *